July 4, 1944.  G. CLAUSING  2,352,690
MACHINE FOR SMOOTHING SURFACES
Filed Dec. 4, 1941   8 Sheets-Sheet 4

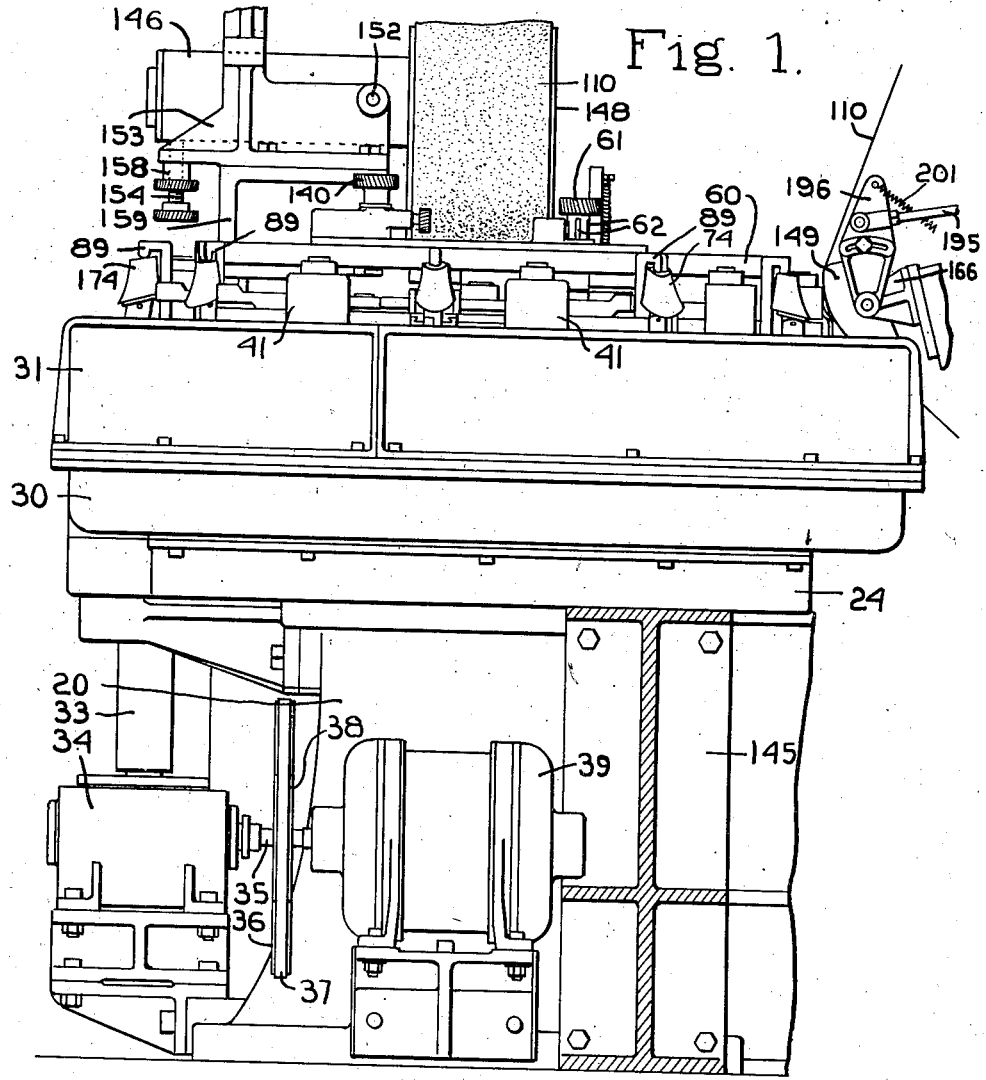

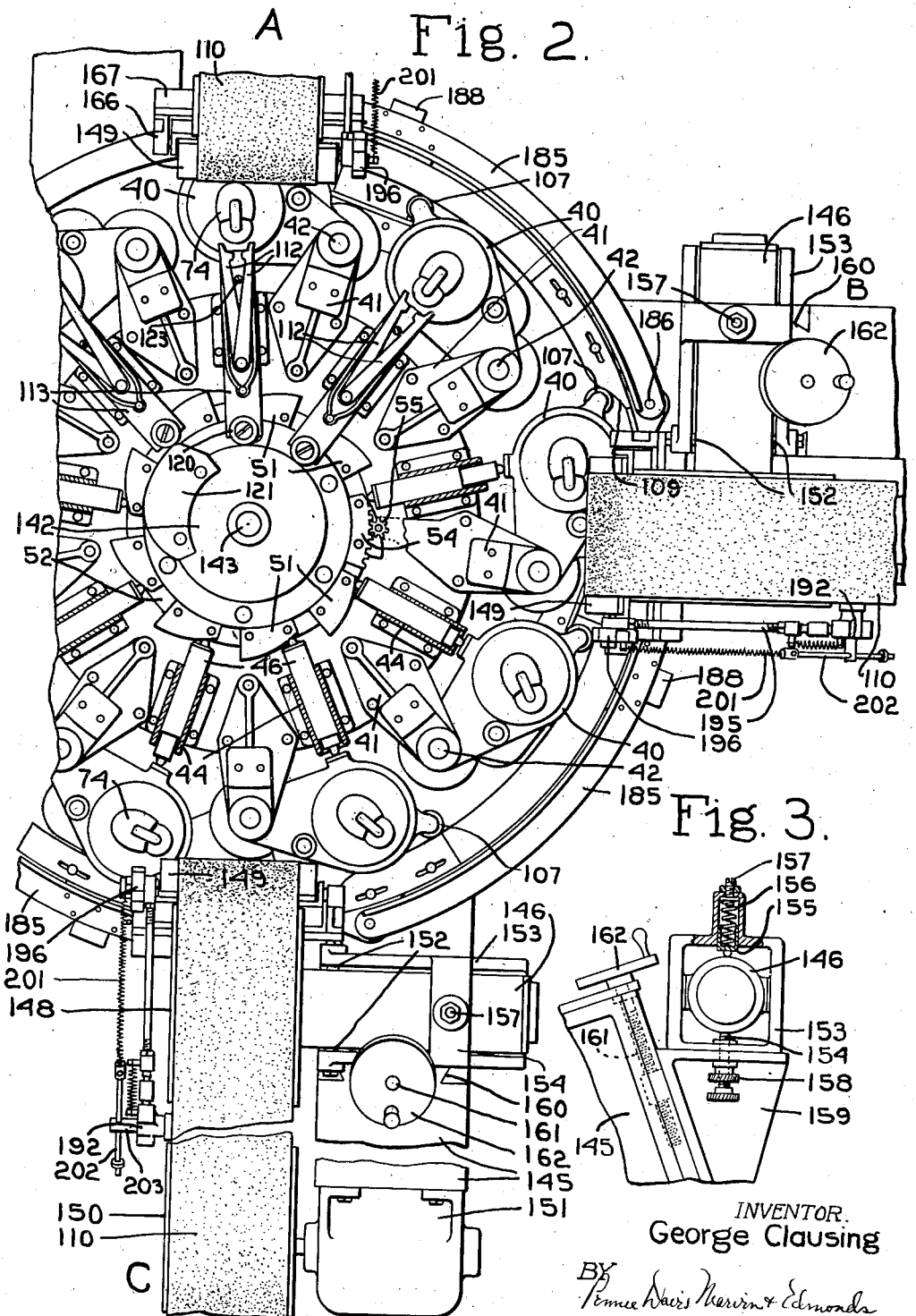

INVENTOR
George Clausing
BY
Pennie Davis Marvin + Edmonds
ATTORNEYS

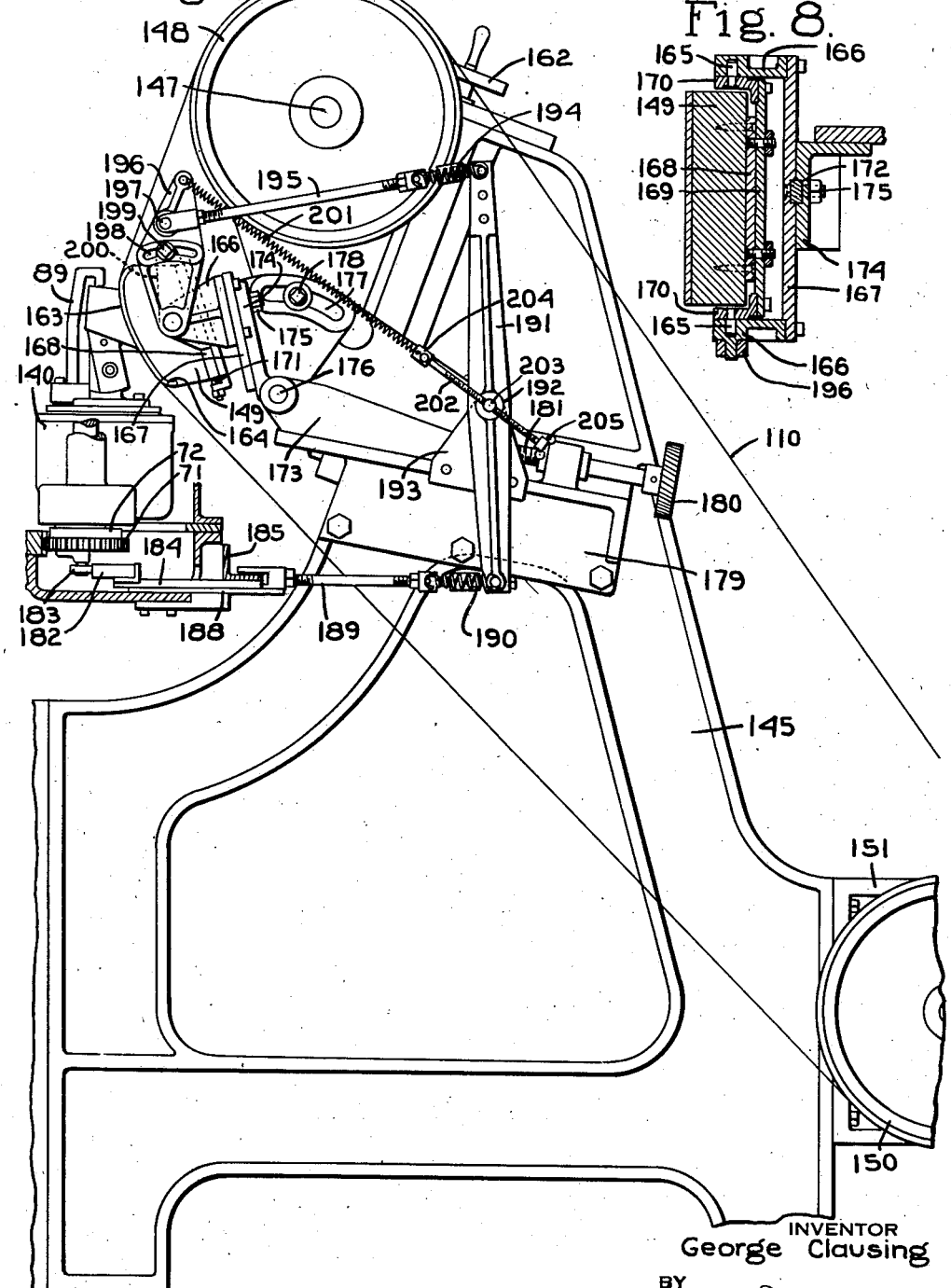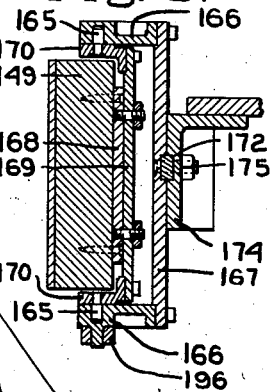

July 4, 1944.                G. CLAUSING                2,352,690
                    MACHINE FOR SMOOTHING SURFACES
                      Filed Dec. 4, 1941           8 Sheets-Sheet 6

INVENTOR
George Clausing
BY
Pennie Davis Marvin + Edmonds
ATTORNEYS

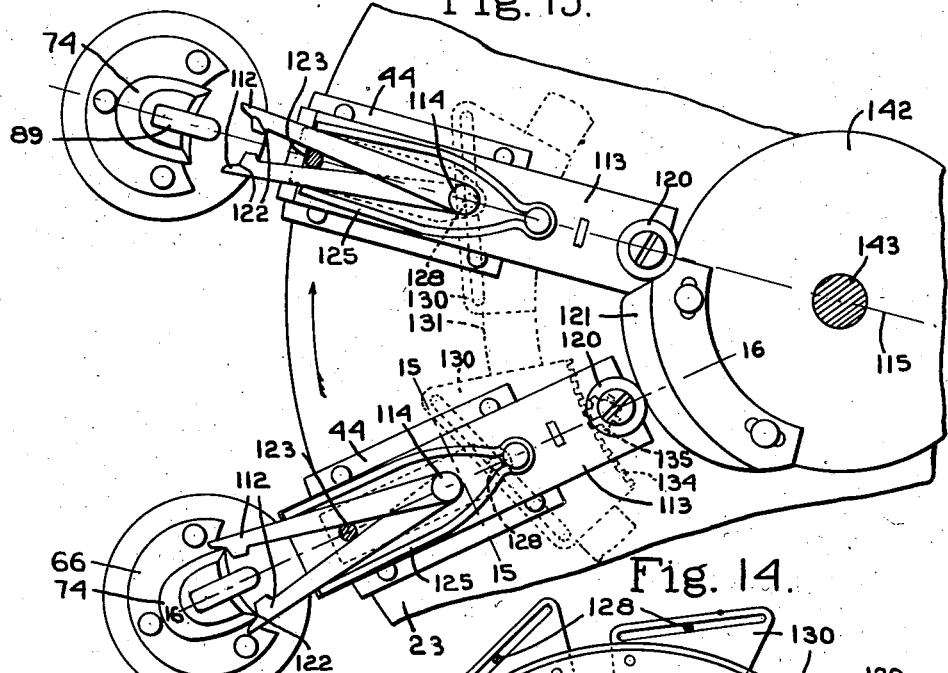

July 4, 1944.　　　G. CLAUSING　　　2,352,690
MACHINE FOR SMOOTHING SURFACES
Filed Dec. 4, 1941　　　8 Sheets-Sheet 8
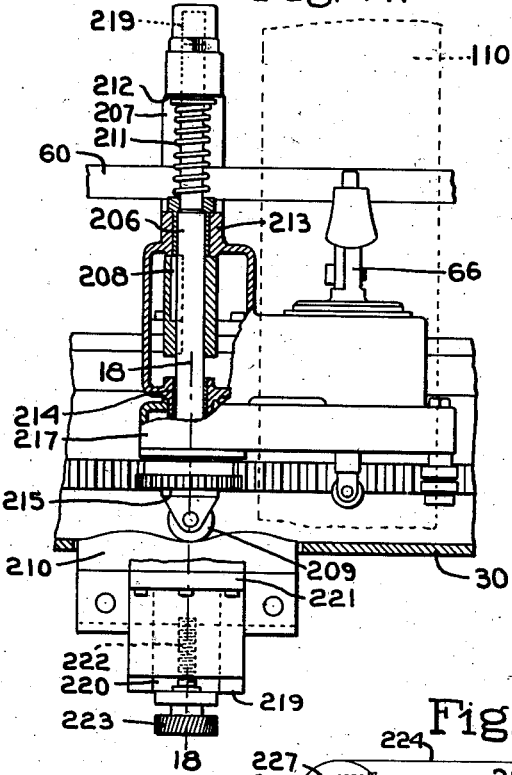
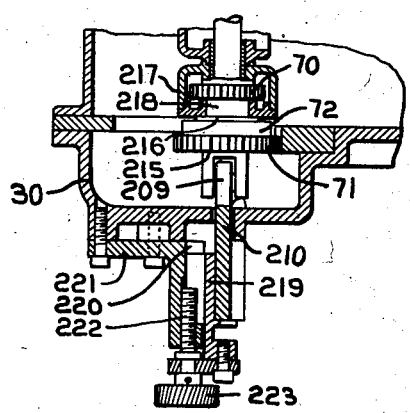
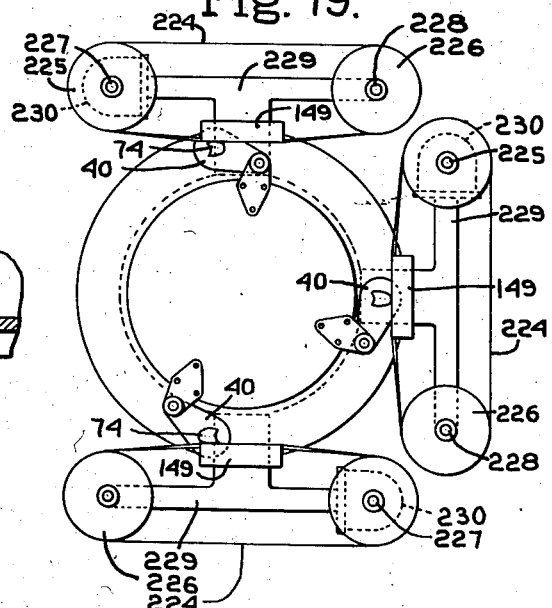
INVENTOR
George Clausing Patented July 4, 1944

2,352,690

UNITED STATES PATENT OFFICE 2,352,690

MACHINE FOR SMOOTHING SURFACES

George Clausing, Portsmouth, Ohio, assignor to Vulcan Corporation

Application December 4, 1941, Serial No. 421,543

25 Claims. (Cl. 51—145)

This invention relates to an apparatus for smoothing the surfaces of irregularly shaped objects, such as the exposed decorative surfaces of a shoe heel, and has particular reference to a novel apparatus for this purpose which is accurate and reliable in operation and may be operated by relatively unskilled labor. This application is a continuation-in-part of my copending application Serial No. 341,882 filed June 22, 1940, and said application is now Patent 2,312,028 issued Feb. 23, 1943.

For illustrative purposes, the invention will be described and illustrated in the form of a machine for smoothing the side and back areas of a shoe heel, although it will be understood that the invention may be employed for smoothing the surfaces of other articles. The smoothing operation on the heel is executed after the turning operation which develops the general contour of the heel. The apparatus of the invention may be used with heels made of natural wood or heels molded from composition materials. In the case of a heel made from natural wood, the back and side areas are shaped upon a spindle shaper known in the heel manufacturing art as a turning machine. As the heel comes from the turning machine it bears minute knife marks and is in a generally rough condition due to wood fibers which have been raised and irregularly distributed over the surface of the heel. The heel smoothing operation, therefore, consists of reducing the back and side areas of the heel to a finely grained, smoothly surfaced condition which will readily receive coating material evenly and smoothly and insure that the external surface of the coating material will present a uniformly smooth appearance.

In the manufacture of heels for shoes, the finish upon the exposed areas must be of the highest quality, and this requirement is particularly stringent in the marketing and sale of heels of all types to be attached to ladies' shoes. In the production of such heels, the final smoothing operation has been performed heretofore by a highly skilled operator and, consequently, has been a relatively costly hand operation.

In the new apparatus, the heel smoothing operation is performed automatically at high production speed and with accuracy, uniformity and high quality results at a greatly reduced cost. The apparatus is provided with a carrier or conveyor for feeding the heels during the smoothing operation or operations. The carrier may be of any suitable type but is preferably circular in form and has arranged about its periphery a plurality of heel holding and feeding heads. The carrier is rotated by power means about a vertical axis upon the base or frame of the machine. One or more operating stations are situated in a fixed position about the periphery of the carrier. Each station is provided with a driven sanding tool preferably in the form of a flexible belt, the active portion of which is positioned closely adjacent the path of the heel feeding heads.

Means are provided for manipulating the heads in a specific manner to cause them to present the heels, carried thereby, successively to the sand belts. The heel is placed in the jack in an accurately gauged position having its heightwise or vertical axis disposed substantially perpendicularly to the plane of movement of the carrier.

A feature of the invention is an automatically actuated positioning mechanism which gauges the position of the heel in the jack, as it is placed therein by an operator. Each of the heel feeding heads is provided with a heel clamping jack, which is opened automatically to eject a treated heel and held open to receive an untreated heel. It is, at this portion of the machine cycle that the heel positioning means is automatically so positioned with respect to the jack, that the operator by utilizing the gauging means accurately and uniformly places the heels to be treated in the jacks successively as they pass a given point in the revolution of the carrier.

Each heel jack is mounted to rotate upon the heel feeding head. The rotation of the jacks is obtained by mounting them upon the upper end of a turret member which is rotatably mounted within the heel feeding head. The heel feeding heads are pivoted upon the carrier to swing in a horizontal plane and at such relative position upon the carrier that the heel held in the jack moves substantially radially outward from the axis of the carrier.

Means are provided for continuously rotating the jack carrying the heels throughout the machine cycle except during the period of ejection of a treated heel and the loading period when an untreated heel is started in the jack, during which period the jacks are held against rotation, but continue to move bodily under the influence of the carrier.

In operating the machine, a heel is placed in a jack, which carries it to the first operating station. As the head bearing the jack and heel approaches the station, the rotation of the jack is commenced and the head is swung outward under the action of a spring or other suitable means, until the heel engages the smoothing tool.

The rotation of the heel is so timed that it will first engage the smoothing tool when the belt surface is exactly tangent to the heel surface at one breast corner. The heel then continues to rotate and traverse the belt surface simultaneously until the other side of the heel surface at the other breast corner becomes tangent to the belt surface, at which time the heel feeding head is swung inward to disengage the heel from the smoothing tool. If other treating stations are provided, the heel is given further treatment in the same manner as above described in connection with the first station.

The effectiveness of the machine is greatly enhanced by a novel means for positively maintaining accurate match and contact of the smoothing tool with the heel surface continuously throughout the smoothing operation. To accomplish this result, the smoothing tool is backed up by a contour block which bears a profile contour complementary to the profile of the heel contour. The smoothing tool is held in close contact with the contour block while it is driven thereacross.

The position of the heel in its jack is so gauged that, as it is rotated by the turret, it will turn about an axis passing substantially centrally vertically through the heel. Such axis being so disposed that the heel when rotated will, as closely as possible, be presented to and coincide with the profile of the form block at all positions it assumes during the smoothing operation. This axis will hereinafter be designated as the axis of symmetry.

Some heels, such as those which are relatively low, can successfully be treated by engagement with the smoothing tool without any additional movement between the heel and tool than its rotation about its axis of symmetry while engaging the tool. However, heels which are higher and contain in their design more intricate curves are more difficult to process accurately. The present invention provides a means for effectively automatically smoothing uniformly every portion of the side and back areas of the heel. In processing the higher types of heels when they are placed in the heel jack with their axis of symmetry coinciding with the axis of rotation of the jack, there appears a variation between the heel profile and the contour of the form block at certain places in its rotation during the treating process. This variation in heel contour is due to certain conventional manipulations of the elements of the heel turning machine which performs the heel shaping operation prior to its delivery to the heel smoothing machine.

A very efficient and flexible means is provided in the present invention for correcting the lack of match occurring between the form block and the heel profile. This means may be characterized broadly as a pattern means. While any type of pattern means may be employed as the principle activating element, the specific form shown and described herein is a cam, the shape of which may be adapted to any given set of conditions. It was determined by careful study that by shifting the position of the form block with respect to the heel to present given portions of its contour to the heel as the heel is rotated to present successive portions of its area to the smoothing tool, the contours of these elements could be accurately matched at all portions of the treated heel surface. It is this shifting of the relative position between the form block and the heel in predetermined timed relation that brings about an accurate match between the heel and the contour block, thus executing an accurately uniform smoothing operation.

The mechanical arrangement for transmitting motion derived by the cam to the form block may be of any suitable construction. A desirable means for accomplishing this end is to pivot the form block longitudinally or parallel to the direction of heel travel. The form block is then rotated through small increments of angular motion by a suitable inter-connecting system of links and levers inter-connecting the cam and the block. Motion of the cam desirably is derived from the passage of a cam follower mounted upon the carrier and passing over the face of the cam, a cam follower being mounted on each of the carrier heads.

The shape of the cam and the timing of its action are calculated to rock the form block in the required manner to match the contours of the heel therewith at all relative positions therebetween. In this manner, a perfectly uniform treatment is given all portions of the heel and the smoothing operation is not only done extremely rapidly, but with such precision that a very fine finish is produced and furthermore the intended heel shape is automatically accurately held within close limits.

To present a better understanding of the invention, a preferred embodiment thereof will now be described. Such embodiment of the invention is illustrated in the attached drawings in which:

Fig. 1 is a side elevation of the machine in which certain parts are removed or broken away.

Fig. 2 is a plan sectional view of the machine taken substantially on line 2—2, Fig. 4.

Fig. 3 is a detail view of the smoothing tool tracking adjustment.

Fig. 7 is a side elevation of a bracket which supports the smoothing tool and the driving elements.

Fig. 8 is a detail of the form block manipulating mechanism.

Fig. 13 is a plan view of a portion of the heel carrier showing the operation of the heel positioning means.

Fig. 14 is a plan detail view illustrating the principal parts of the means for adjusting the heel positioning device to receive heels of various sizes.

Fig. 15 is a cross sectional view on line 15—15, Fig. 13.

Fig. 16 is a cross sectional view on line 16—16, Fig. 13.

Fig. 17 is a side elevation of a different embodiment of a heel treating head.

Fig. 18 is a partial sectional view on line 18—18, Fig. 17.

Fig. 19 is a diagrammatic view illustrating a variation in the construction of means for driving the smoothing tool.

Figure 4:
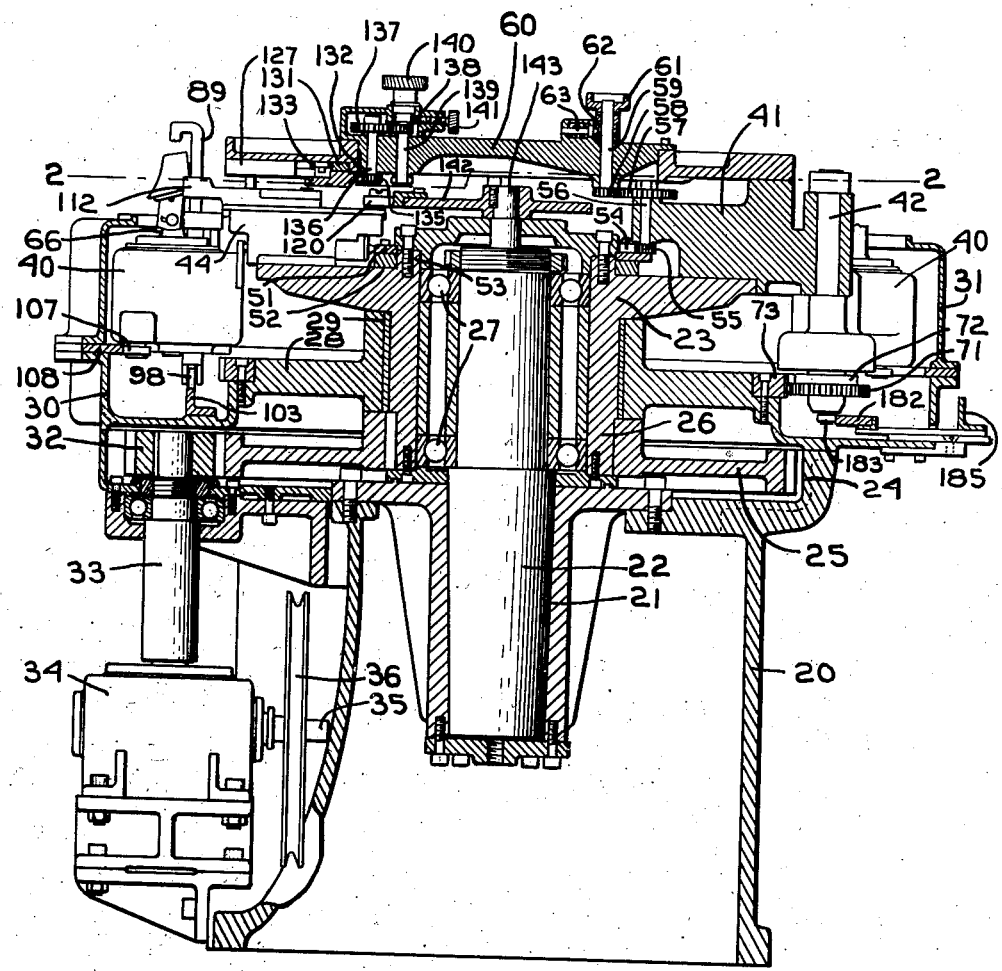
Fig. 4 is a central vertical sectional view of the machine.

The active elements of the machine are mounted upon a frame or base 20 which has a central vertical aperture therein which is desirably slightly tapered downwardly and in which a post 22 is tightly received. The upper portion of the post 22 has rotatably mounted thereon a circular carrier member indicated generally at 23. The upper portion of the base 20 is constructed in the form of an annular housing 24, within which a driving gear 25 is received. The gear 25 is secured upon a downwardly projecting sleeve portion 26 of the carrier 23. The carrier and gear rotate upon ball bearings 27, the inner races of which are secured upon the post 22 and the outer races of which are secured within a central aperture of the sleeve 26 of the carrier.

Upon the upper periphery of the gear housing 24 is fixedly secured, a circular superstructure 28, which has a bearing 29 within which the sleeve 26 of the carrier rotates. The outer peripheral portion of the superstructure 28 is provided with an annular shaped housing 30 within which the lower elements of a plurality of heel feeding heads, to be described in detail hereinafter, travel during the execution of the machine cycle. Secured to the upper portion of this housing is an annular covering 31 which encloses the upper portion of the heel feeding heads to protect the mechanism from dust and foreign matter and also the operator from injury by contact with the traveling heads. Suitable openings are provided in the covering at each of the three processing stations to permit the smoothing tool to engage the heels held in the heel feeding heads.

A pinion gear 32 meshes with the drive gear 25 and is secured upon the end of a vertical shaft 33 journaled at its upper end in a bracket secured to the base 20 of the machine and connected at its lower end to the output shaft of a conventional speed reducing unit 34. The input shaft 35 of the speed reducing unit has a pulley 36 thereon. A driving belt 37 passes over and drives the pulley 36 and also passes over a small pulley 38 upon the shaft of a motor 39 fixed upon the base 20. The carrier 23 is thus driven at a slow rotative speed by the motor 39.

The carrier 23 supports and imparts feeding motion to a plurality of heel feeding heads 40 of identical construction. The number of heads employed is immaterial and is based upon the physical size of the machine and the desired rate of production. The carrier as shown employs nine heel feeding heads which are pivotally secured upon and evenly spaced around the periphery of the carrier 23. The heads 40 are pivoted to the carrier at one of their ends upon supporting brackets 41 which are securely bolted upon the top face of the carrier. Each bracket 41 has a pivot shaft 42 rotatably received and vertically disposed in their outer ends. The pivot shaft 42 extends downward into and has a bearing in the pivoted end of the heads 40. The other end of each head is free to move with a swinging motion about the axis of the shaft 42. The free end of the head supports and is provided with means to rotate a heel to be processed in a manner to be described hereinafter. The heads 40 are so disposed around the periphery of the carrier that a line passing through the axis of the pivot shaft and substantially the center of the heel supported on the outer end of the head will lie substantially tangential to a radius from the center of the carrier. The heel end of the head, is movable substantially radially outward from the carrier axis.

Each head 40 is urged outwardly away from the carrier axis. This may be accomplished in any suitable manner, such as by spring pressure. A desirable means for doing this is shown in the drawings. For each head, a device is provided for supplying the necessary pressure to urge the heads outward. A desirable construction comprises a spring supporting member having a body portion 44 secured upon the upper face of the carrier having an aperture 45 therein extending radially outward from the carrier axis. Within the aperture 45 a spring expansion member 46 is slidably received. The member 46 is composed of two elements 47 and 48. The element 47 is telescoped within the element 48. The two elements are centrally apertured and together form a chamber within which is received an expansion spring 49 which engages the end walls of the members 47 and 48. The end faces of the elements 46 are provided with small, preferably spherical contact bosses 50. The inner ends of the expansion member 46 engage a plurality of adjusting cams 51, while the outer ends thereof engage the free ends of the heads 40. The cams 51 are arranged about the axis of the carrier and are secured to a ring shaped supporting member 52 which is rotatable upon a cylindrical boss 53 extending upward from the upper face of the carrier. A gear segment 54 is secured upon the ring and cam assembly in position to mesh with a pinion gear 55, which is secured upon a shaft 56, which in turn, is rotatably mounted in an inward extension of one of the brackets 41. The upper end of the shaft 56 has secured thereon a gear 57 which in turn meshes with a pinion 58 secured upon a shaft 59 which has a bearing in and projects upward through and above the upper face of a top plate 60.

The plate 60 is generally circular in shape and is secured upon the upper extremity of the brackets 41. The upper end of the shaft 59 has secured thereto a hand wheel 61, the lower portion of which is provided with notches 62 into which a spring pressed plunger 63 projects. The shape of the notches and the end of the plunger are such that the hand wheel may be rotated by applying a considerable force; but is held against rotation by any force likely to be imposed thereon by the normal operation of the machine. By rotating the wheel 61, manual adjustment of the tension in the springs 49 is obtained. By increasing or decreasing the spring tension, a greater or less thrust is given the free end of the head 40 bearing the heels to be treated. In the development of the operation of the machine, hereinafter to be set forth, the usefulness and desirability of this adjustment will be set forth.

Figure 5:
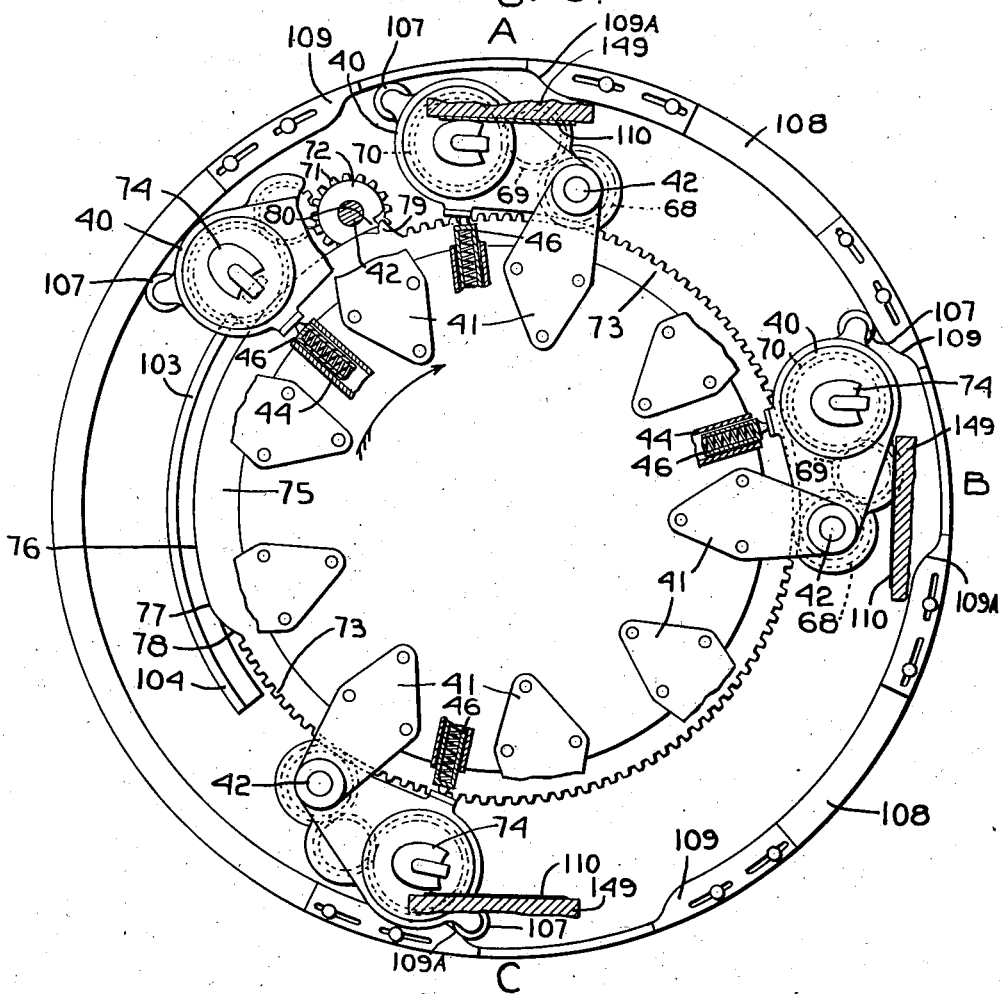
Fig. 5 is a plan sectional view with certain parts broken away or removed and is intended to illustrate more or less diagrammatically at least a portion of the cycle of operation of the machine.

The heads 40 are all identical in construction. Each head comprises a casing 64, within which a turret 65 is rotatably mounted upon a vertical axis. The turret 65 has mounted upon its upper end, the heel holding jack indicated generally at 66. The turret is desirably constructed to rotate upon a pair of ball bearings 67 and has secured to its lower end, a gear 68 situated within the casing. The gear 68 meshes with an idler gear 69 journaled in the casing, which in turn, meshes with a gear 70 secured to the pivot shaft 42. The shaft 42 extends downward and has its main bearing in the upper portion of the casing 64 and projects downward through the bottom wall thereof and has secured upon its lower end a gear 71 and a specially shaped gear-like turret controlling member 72. The gear 71 meshes with a ring gear 73 fixed upon the superstructure 28 a ring gear 73 fixed upon the super-structure 28 in concentric relation to the axis of the carrier and is illustrated best in Fig. 5. The gear 73 extends around the periphery of the superstructure 28 for approximately 270° and serves to drive the gear train in each head, composed of the gears 68, 69, and 70, for approximately 270° of every revolution of the carrier. The turret carrying the heel jacks containing the heels 74 are thus continuously rotated for the greater portion of their translational motion during a single revolution of the carrier.

The remaining portion of the machine cycle comprising substantially 90° of a revolution of the carrier is devoted to the unloading of the treated heels from the machine and the feeding of untreated heels thereto. During the execution of these operations, the rotation of the jacks is discontinued while their translational motion, occasioned by the rotation of the carrier, is continuous. Any suitable means may be employed to accomplish this end. A preferred construction is shown in Figs. 5, 10, 11 and 12. The interrupted portion of the ring gear 73 is occupied by a specially constructed segment 75. This segment has a smooth outer edge 76 which is concentric with the carrier axis, except at its two end portions. The end 77 is provided with a cam face 78 which presents a curve extending from a position which the leading face of the next succeeding tooth to the last normal tooth on the ring gear 73 would occupy, and outward away from the axis of the carrier in a smooth curve until it becomes tangent to the face 76. The cam face 78 co-acts with the special controlling gear 72 to stop rotation of the turret in a manner to be described hereinafter. The other end of the segment 75 is of special construction and presents a single gear tooth 79 of special form. The tooth 79 shown best in Figs. 11 and 12 co-operates with a specially shaped tooth 80 upon the control gear 72 to initiate rotation of the turret subsequently to the placement of an untreated heel in the heel jack by a machine operator.

The above outlined mechanism for starting and stopping the rotation of the turret, functions in a manner similar to a Geneva wheel motion. The action of one head only will be described since they all function in the same manner. As the carrier rotates in the direction of the arrow in Fig. 5, the gear 71 is rotated which causes rotation of the gear 70 and through the inter-connecting gear train; also the gear 68, and the turret connected thereto. This gear movement is so timed that when the gear 70 reaches the last tooth on the gear 73 adjacent the end portion 77 on the segment 75, a relatively flat portion 81 on the control gear 72, will engage the curved cam face 78. The cam portion is so designed that it will cause the flat portion 81 of the gear 72 to smoothly ride along its face and thence into contact with the concentric face 76. The face 81 has a curvature complementary to the face 76 and its position with respect to the carrier axis is such that it snugly fits against the face 76 thus locking the gear train 68, 69 and 70 against rotation. The gear 68 is so timed with respect to the gear 70 that during this period when the gears are locked against rotation the heel jack will be positioned to present the back of a heel held in the jack radially outward from the carrier axis and with the heel breast corners intersecting a tangent to a radius from a radially central plane of the heel to the axis of the carrier.

Figure 12:
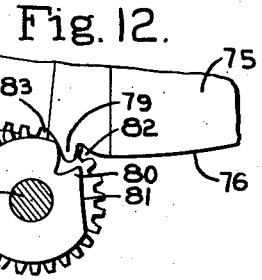
Fig. 12 is a detail view illustrating the operation of the means provided to start and stop the rotation of the heel jack at the loading and ejecting stations.

The control gear 72 then moves along the face 76 of the segment. During this period, a treated heel is released from the heel jack and an untreated heel is put in place therein by the operator. When the control gear 72 and its companion gear 71 reaches the other end of the segment 75, a tooth 80 engages the tooth 79 and the gear train within the head is again caused to rotate. As the gear 71 and the control gear 72 starts to rotate, the tooth 80 rides smoothly into the space 82 in the segment 75 and the face 81 of the control gear 72 turns away from the segment 75. As the rotation continues, a tooth 83 on the gear 71 engages the first tooth of the ring gear 73, as shown in Fig. 12 of the drawings. The gear 71 and its connected train then continues to rotate by reason of its engagement with the ring gear until it again arrives at the portion 78 of the segment 75, during which period of the machine cycle the control element 72 rotates idly since its diameter is smaller than that of the gear 71.

Means are provided for manipulating the heel jack to release a treated heel and permit an untreated heel to be inserted therein and clamped in position. The heel jack 66, as above stated, is mounted upon the turret 65. The jack is provided with a base member 84 which is horizontally pivoted upon a post 85 at 86. The post 85 is secured to and projects upward from the turret 65. The jack base member 84 is adjusted for correct angular position to receive the heel seat of a heel and locks in place by means of a screw 87, which extends through a circular slot 88 in the member 84 and has screw threaded engagement in the post 85. The top face of the member 84 is correctly shaped to correspond to the shape of the concave attaching face of the heel 74, and its angle is so adjusted that when a conventional heel is placed thereon, its axis of symmetry will be substantially vertical. The adjustment afforded by the pivotal connection of the member 84 upon a post 85 provides for correctly positioning all types of heels upon the jack. The toplift end of the heel is engaged by an L-shaped clamping member 89, the upper horizontal portion 90 of which is roughened on its under face to rigidly grip the heel. The vertical portion 91 of the clamp extends downward into the turret 65. Its lower end telescopes into a clamp lifting member 92 axially slidable vertically in the turret 65. The L-shaped clamp 89 is locked in a given relative position with respect to the lifting member 92 by a set screw 93 having screw threaded egagement with the member 92 and bearing against a flat portion 94 on the member 89. Heels having various heights may thus be clamped within the jack by raising or lowering the clamping member to suit the size of the heel. Rotation of the heel clamping assembly is prevented by a collar 95 secured to the member 92 and having a vertical aperture 96 therein within which a pin 97 is received. The lower end of the pin is anchored in the top face of the turret.

The lifting member 92 is provided with a cam roll 98 rotatably mounted in the bifurcated lower end thereof. The lifting member carrying the clamp 89 is spring pressed downward causing the arm 90 to engage the toplift end of the heel.

Figure 6:
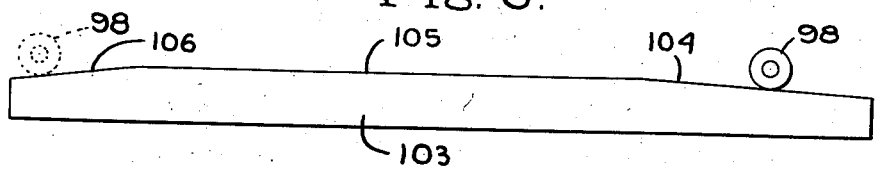
Fig. 6 is a side view of a development of the heel jack opening cam.

Any spring means may be provided to accomplish this purpose. As shown herein, a compression spring 99 functions in this capacity. The spring surrounds the lifting member and bears at one of its ends against the collar 100 integral therewith and at its other end against a sleeve 101 tightly received in the turret and which serves as a top bearing for the vertical movement of the lifter 92. The lower bearing for the lifter 92 is provided by the sliding engagement of the collar 100 within the spring chamber 102. The heel clamp may be raised into its releasing position as shown in dotted line in Fig. 10 by any suitable means. A preferred mechanism for accomplishing this purpose comprises a cam 103 secured upon the inside of the bottom wall of the casing 39 and curved to the radius of the path of the lifting roll 98. The length of the cam 103 and its position upon the machine is so determined that directly after the turret is stopped revolving by the arrival of the control member 72 at the segment 75, the roll 98 will ride upon the rising face 104 of the cam shown in the developed view of the cam illustrated in Fig. 6. This upward movement of the cam releases a treated heel, which falls out or is ejected from the machine by any suitable means, such as an air jet, not shown. The clamp is held in its releasing position by the flat top 105 of the cam 103, during which period an untreated heel is introduced into the jack and held therein by the operator until the head 40 closely approaches its position where the rotation of the turret is again initiated in the manner above set forth. At this time, the roll 98 rides downward upon the portion 106 of the cam 103, thereby permitting the spring 99 to clamp the heel, which then is carried to the processing stations.

Each head 40 is provided at its outer or free end with a roller 107, which is held in engagement with and rolls upon the inner face of a track 108 by means of the spring 49 within the members 46. The track 108 is concentric with the axis of the carrier for the greater part of the circumference of the machine.

At each processing station, however, the track is interrupted and cams 109 are provided, along which the rolls 107 travel to permit the head 40 to swing outwardly and thus move the heel contained in the jack into engagement with the smoothing tools 110 which perform the heel smoothing operation. These smoothing tools are desirably in the form of flexible belts having abrasive matter on their working face or may be provided with a suitable polishing compound. The smoothing tools are driven across and held in close contact with the active face of form blocks, which are given a contour complementary to the curve of the master profile of the heel and which will be described in more detail hereinafter. The position of the cams 109 is adjustable along the track 108 and is accurately set to cause the heel to engage the belt 110 with one of its side faces tangent thereto at its breast corner. The heel continues to rotate, presenting successive portions of its side and back areas to the belt until its other side face becomes tangent to the belt at the breast corner, at which time, another set of cams 109A engage the rolls 107 on the heads 40, forcing the heads to swing inward, thus retracting the heel from the tool 110, after which the rolls 107 traverse the track 108, functioning at the second and third stations in the same manner as that described at the first station. The shape of the cams 109 may be and should, for best operation of the machine, be designed to rapidly bring the heel into close proximity to the belt and then retard the speed of the outward travel to permit gentle contact between the heel and the belt.

In keeping with the high degree of accuracy of operation and the true perfection of its work, the machine is provided with means for placing heels in the jack with a high degree of precision. The principle of operation of this positioning means may be incorporated in various mechanical designs without departing from the main inventive idea. A simple form is illustrated in the drawings, wherein a pair of positioning fingers 112 are arranged to move into accurate heel centering position with respect to the heel jack. There are heel centering mechanisms in connection with each heel jack and they are identical in construction. Only one of these mechanisms, therefore will be described. The fingers 112 are pivotally mounted at one of their ends upon the longitudinal center line of a slide 113 at 114. The slide 113 is mounted symmetrically with respect to a radius 115 from the carrier axis. The slide 113 is mounted to move lengthwise along the radius toward and from the turret. A convenient construction for supporting and guiding the slide is to mount the slide upon the top of the member 44. A dovetail guideway 116 is constructed between the slide 113 and the top face of the member 44. Any suitable means, however, may be employed to guide the slide 113. A chamber 117 is provided beneath the slide 113, within which a compression spring 118 is received. The spring 118 engages the outer wall of the chamber 117 at one end and at its other end, engages an abutment 119 depending from the slide 113. The slide is thus urged toward the carrier axis by the spring. At its inner end, the slide carries a cam roll 120, which is held against a cam 121 under the influence of the spring 118. The cam 121 actuates the slide in a manner to be described hereinafter. The outer ends of the fingers 112 are provided with substantially square cornered recesses or rabbets 122, within which the breast corners of the heel 74 are received. The degree of separation of the fingers 112 is determined by a pin 123 which is rigidly fixed within and extends downward from another slide 124, which is capable of adjustment parallel to the slide 113. The pin 123 is located exactly upon the radius 115 and extends between and is engaged by the inner faces of the fingers. The outer or free ends of a U-shaped spring 125 bear upon the outer faces of the fingers, which causes the inner faces thereof to remain in engagement with the pin at all times. The position of the pin, therefore, determines the position of the outer ends of the fingers and since the pin is located centrally of the mechanism, it results in positioning the outer ends of the fingers accurately with respect to the radius 115 and the axis of the turret.

The pin 123 is adjustable along the radius from the carrier axis. This adjustment may be derived in any suitable manner. A suitable construction for this purpose is illustrated in the drawings. The slide 124 is received within a dovetailed slot 126 in a block 127 secured upon the bottom face of the top plate 60. The inner end of the slide 124 has rigidly secured therein a stud or pin 128 which projects into a slot 129 in a cam plate 130. The slot 129 is angularly disposed with respect to the radius from the carrier axis. The cam plate is normally held in fixed position with respect to the other elements of the mechanism and consequently, by reason of the presence of the pin 128 in the slot, also holds the slide 124 in fixed position.

The cam plates 130 for each positioning mechanism are mounted upon and equally spaced about the periphery of a supporting ring 131, which is rotatably mounted upon a circular boss 132 depending from the top plate 60 and positioned concentrically with the carrier axis. Retaining plates 133 engage and hold the ring 131 upon the boss. Means are provided for rotatably adjusting the ring 130 upon its supporting boss 132. A suitable mechanism for accomplishing this result, is shown in the drawings in which one of the plates 130 is provided along its inner edge with gear teeth 134. A pinion 135 fixed upon the lower end of a shaft 136 meshes with the teeth 134. The shaft 136 has a bearing in the plate 60. The upper end of the shaft 136 has secured thereto a gear 137 which in turn meshes with a pinion 138 fixed upon a shaft 139 which is journaled in the top plate 60. The upper end of the shaft 139 has secured thereon a hand wheel 140. Through the medium of the inter-connecting gear train just described, the operator may, by turning the hand wheel 140, rotate the ring 130 and thereby simultaneously adjust the position of the pins 123 with respect to the carrier axis. The machine operator having the above described adjusting means at his disposal may positively, accurately and simultaneously adjust all of the heel positioning fingers to adjust the machine to receive any size heel with a minimum of effort and in the shortest possible time. To make the adjustment, the rotation of the carrier must be stopped and a sample heel is inserted between the positioning fingers while the adjusting hand wheel is moved until the fingers embrace the breast corners of the heel without any side play. The adjustment is then locked against displacement by tightening a set screw 141 against the shaft 139. The adjustment must be made, however, at the particular heel jack which happens to be at the loading station, because at this time, the cam 121 acting upon the roll 120 has moved the slide 113 outward away from the carrier axis into its gaging position, as shown in the lower portion of Fig. 13. After this adjustment is made the machine is ready for operation and as the carrier rotates, the jacks are moved away from their loading positioning and substantially at the same time their rotation is resumed, the roll 120 rides down from the outer edge of the cam 121 and the slide 113 is retracted by the spring 118 out of the path of the jack to permit its free rotation. The cam 121 is rigidly fixed upon a supporting plate 142, which in turn is fixedly mounted upon an extension 143 of the post 22.

The cam 121 is placed upon the disc 142 in such position that the roll 120 on each slide will successively engage the cam and project the fingers outward into their heel engaging position prior to the arrival of the jack at the loading station. The fingers are then held in this position until a heel has been placed in the jack by the operator with its seat properly engaging the base 66 thereof and its breast corners received accurately in the recesses 122 of the fingers and is held in this position until the clamp 89 descends to clamp the heel, after which, as above pointed out, the roll 120 rides off the cam and the fingers are retracted inward to prevent their engagement with other machine parts during the operation of the machine and until the jack again arrives at the ejecting and loading station. The upper positioning mechanism shown in Fig. 13 shows the engaging fingers in their retracted position.

To produce the desired smoothing action upon a heel, one or more smoothing stations are arranged about the periphery of the carrier adjacent to and in position to be engaged by the heels carried in the heel jacks. Various types of smoothing tools may be employed, depending on the character of the work to be accomplished. The smoothing tool is desirably in the form of a flexible belt 110. The character of the smoothing tool at each treating station may be varied at will. A typical arrangement would be to employ a series of abrasive belts. At the first station a relatively coarse abrasive could be used, while at the succeeding stations, a progressively finer abrasive could be employed, thereby producing a final finish of high quality. The last station or the last two stations could be provided with a special type of smoothing tool upon which suitable polishing compounds could be spread and thus execute at these stations a polishing operation upon the heel. It will be noted that not only is the possible speed of production of the machine exceedingly high; but that the plurality of treating stations provided does not diminish the speed of production in any way, since the three processing stations are functioning simultaneously.

Since the three stations designated A, B and C in the drawings are identical in construction, only one, therefore, will be described. The smoothing belts 110 are supported along with their associated mechanism upon brackets 145. The three stations are desirably disposed at ninety degrees about the periphery of the carrier. Each bracket is securely bolted to the base 20, thereby producing a unitary structure. The smoothing belts as shown in the drawings, are driven in a manner to produce a vertical cut or smoothing action upon the heel. While this vertical smoothing action is a valuable and effective feature of the invention, it is also within the scope thereof to arrange the smoothing belts to produce crosswise or horizontal smoothing action upon the heel, as illustrated diagrammatically in Fig. 16.

The brackets 145 are provided at their upper portion with a bearing 146 within which a shaft 147 is received. The shaft 147 projects outward from its bearing and has mounted thereon a pulley 148 over which the upper run of the smoothing belt 110 travels. The inner run of the belt passes over and is held in close contact with a form block 149 and thence passes downward over a driving pulley 150 mounted upon the shaft of a motor 151 and then passes in a straight outer run upwardly to the pulley 148. The bearing 146 is provided with a cylindrical housing and is arranged for adjusting its alignment in a vertical plane, thereby to accurately control the tracking of the smoothing belt over its supporting and driving pulleys. To accomplish this end, the bearing housing 146 is pivoted upon a pair of oppositely disposed trunnion bearings 152 adjacent its inner end. The trunnions are fixed in a supporting member 153. The outer end of the bearing 146 is adjustable upwardly and downwardly to vary the angular position of the pulley 148. This adjustment may be accomplished in any suitable manner, such as that shown in the drawings, wherein the bearing at its outer end projects through a yoke constituting a portion of the bearing supporting member 153 and having a clamping screw 154 mounted for vertical adjustment in the lower portion of the yoke. Oppositely disposed to the screw 154 and bearing upon the top of the housing 146 is a vertically movable plunger 155 backed by a relatively heavy spring 156.

The tension of the spring 156 is adjustable by means of the screw 157 engaging the upper end of the spring. To track the smoothing belt therefore it is necessary only to adjust the screw 154 and lock it in correct position by means of a lock nut 158 provided for the purpose.

To accommodate smoothing belts, which vary slightly in length and to obtain the correct degree of tension in the belts, the pulley 148 and its associated bearing assembly are arranged to be vertically adjusted. To secure this adjustment, the pulley and its bearing assembly are mounted upon a substantially vertically adjustable bracket 159, which is movable upon the bracket 145. The bracket 159 is provided with a female member of a dove-tail slide 150, while the male portion of the slide is formed upon the bracket. The bracket 159 is adjustable up and down by means of a screw 161 having a hand wheel 162 at its upper end. The screw 161 is held against axial movement on the bracket 145 by a suitable bearing and collar and has threaded connection with the bracket 159 in the conventional manner.

The form block 149 presents upon its active face 163 a contour which has a master profile curve which varies in radius from its upper to its lower extremity. This profile is so designed that some portion of its length will match the profile of any portion of practically any type and size of heel. If a heel of highly special shape is to be treated, another block may be substituted, bearing the appropriate profile. The block may be made of any material and is herein shown as made of wood and may or may not be provided with a relatively thin facing 164 of resilient or semiresilient material.

As suggested in the brief description in the first part of this specification, the heels may be treated correctly by moving them across and in engagement with the belt 144 at the form block while rotating them about their height-wise axis and performing the operation while the form block is held motionless. However, many types of heels, such as the higher type, used in ladies' fancy and dress shoes, which present more complicated contoured surfaces, it is found that by properly shifting the position of the form block 149 with respect to the heel and in accurately predetermined timed relation to the movement of the heel across the smoothing belt and to its rotational position during such travel, the contours of any heel may accurately be matched with the contour block uniformly to smooth every portion of the heel surface. To produce the desired relative motion of the form block 149 with respect to the heel, any suitable mechanism may be employed. It is within the scope of the invention to either move the heel with respect to the stationary form block or move the form block with respect to a heel maintained in a unidirectional axial position.

Preferred forms of mechanism for accomplishing the desired end are illustrated in the drawings. In one form of the mechanism, and the form which is preferred of the two shown in the drawings means are provided for the shifting of the form block with respect to a heel which is rotated about a uni-directional axis throughout the smoothing operation. In this preferred form of mechanism, the form block 149 has an active face presenting a contour generated by the straight line movement of a curve which is complementary to the master curve of the heel profile. The active face of the block is positioned closely adjacent to the path of the heels held in the heel jack and is substantially tangent to the periphery of the carrier. The block is arranged to be tilted about an axis substantially parallel to its face and situated outwardly away from the carrier axis a short distance from its face. The position of this axis is not highly critical. An effective position for the axis is found to be substantially midway of the block vertically and about one and one-half inches outward from its face. To secure the desired motion of the block, it is pivotally mounted upon a pair of trunnions 165 situated upon the determined axis. The trunnions are journaled at their outer ends in a pair of brackets 166 projecting outward from a supporting plate 167 and embracing the ends of the block.

To provide a more efficient and rigid construction, the wooden block 149 is firmly screwed to a metallic plate 168, which in turn, is fastened to another plate 169. Projecting inward from the plate 169, are a pair of ears 170 which embrace the ends of the block 149 and provide a durable metallic support within which the inner ends of the trunnion 165 are anchored. Means are provided for adjusting the horizontal alignment of the plate 168 and consequently the block 149 with respect to the plate 169. This adjustment may be of any suitable construction. An effective means is shown wherein a pair of stud bolts are provided to secure the plates together. The apertures in the plate 169, through which the bolts pass are elongated slightly vertically, thereby permitting the block to be shifted horizontally. The purpose of this adjustment is to accurately line up the face of the block 149 with the plane in which the heels travel. To provide a readily manipulated means to make this adjustment, a set screw 171 is employed, having threaded engagement with an ear on the plate 169 and having its end engaging the bottom edge of the plate 168 at one end thereof. By making adjustment by means of the screw 171, small increments of motion may be imparted to the block and when the exact adjustment is secured the bolts are tightened to rigidly secure the two plates together.

An initial or static matching relationship must be established between the block contour and the heel contour. To aid in arriving at this adjustment, the block 149 is provided with means for vertically adjusting it with respect to the heel. Any suitable means may be provided for obtaining this result. A desirable construction is shown in the drawings, wherein a vertically disposed rabbeted connection 172 is provided between the plate 167 and a main block supporting bracket 173. The bracket 173 is composed of a substantially horizontally disposed base portion and a substantially vertically disposed plate or wall section 174, which is angularly adjustable with respect to the base portion. It is upon the section 174 that the plate 167 is secured and is vertically adjustable thereon through the medium of the rabbeted joint 172. After a correct vertical adjustment of the block with respect to the heel has been obtained, a clamping screw 175 is tightened to lock the parts in position.

The member 174 is pivoted to its base portion at 176 and is provided with a circular slot 177 concentric with the pivot 176 within which a clamping screw 178 is received and which serves to lock the parts in adjusted position. This angular adjustment provides further flexibility in establishing the desired relationship between the heel and the form block 149.

The bracket 173 is slidably mounted to move the form block 149 toward and from the axis of the carrier. Bracket 173 is secured to another bracket 179 which is rigidly secured upon the main base bracket 145. Adjustment of the bracket 173 upon the bracket 179 is effected by turning the hand wheel 180, which is secured upon the end of a screw 181 and fixed against axial movement upon the bracket 179 and having screw threaded engagement with the bracket 173. Straight line relationship between the two brackets is obtained by a dovetail slide—one member of which is formed upon the block 179 while the other member of the slide is formed upon the bracket 173.

Figure 9:
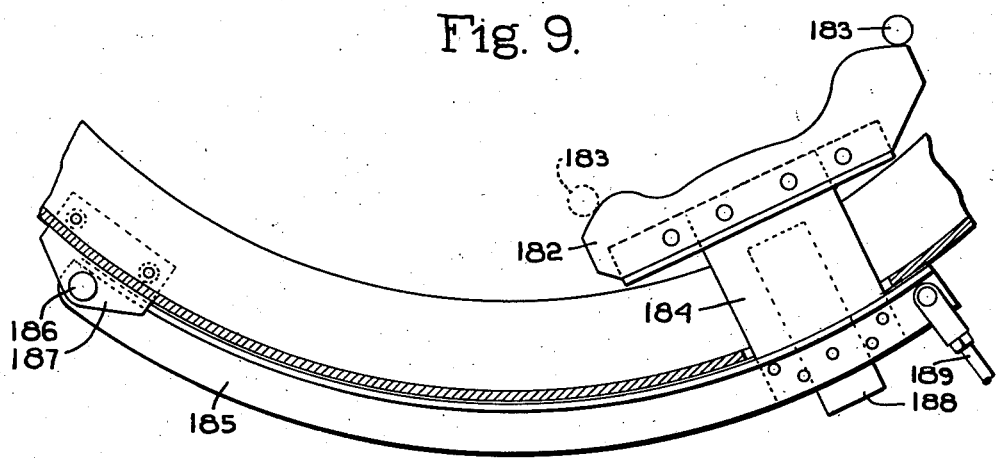
Fig. 9 is a plan detail view illustrating the construction of the camming device for matching contours between the heel and smoothing tool.
Figure 10:
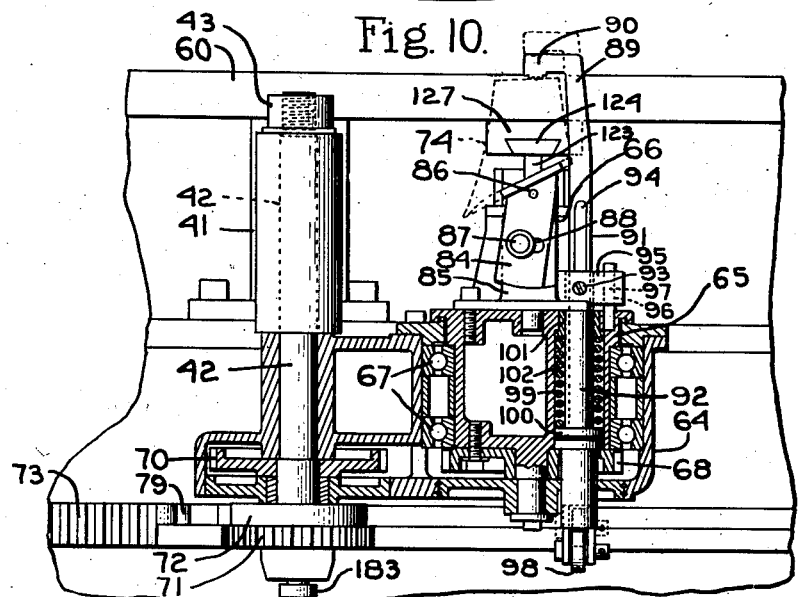
Fig. 10 is a longitudinal sectional view of a heel holding head taken on line 10—10, Fig. 11.
Figure 11:
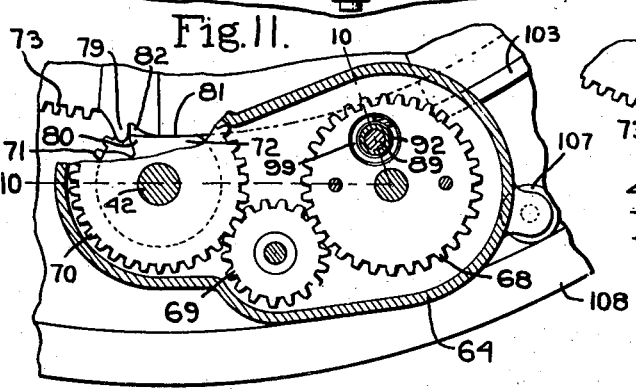
Fig. 11 is a horizontal sectional view through a heel holding head.

As pointed out in the brief description, in the first part of this specification, the form block 149 is provided with means which automatically swing in about the trunnions 165. This swinging motion is derived from a cam 182 shown best in Fig. 9. The cam is mounted to move substantially radially outward from the axis of the carriar. A suitable means for doing this is illustrated in the drawings, wherein the cam is situated within the housing 39 within the path of a follower 183 rotatably mounted upon the lower end of the pivot shaft 42 of each of the heads on the carrier. The cam 182 is removably mounted upon a supporting plate 184 which extends outward through an aperture in the wall of the housing 39 and is secured upon the free end of a relatively long fulcrum lever 185. The lever 185 is elongated to secure a substantially straight radial movement of the cam. The lever is shaped to conform to the curve of the housing 39 to produce a compact design. The lever 185 is fulcrumed at 186 upon a fulcrum block 187 secured to the machine base. The plate 184 rests upon and slides over a guide plate 188 secured to the bottom wall of the housing. The extreme free end of the lever 185 has pivoted thereto a link 189. The link 189 is universally connected at its outer end 190 to the lower end of a lever 191. The lever 191 is fulcrumed at 192 upon a bracket 193 rigidly secured to the bracket 179. The upper end of the lever 191 is universally connected at 194 to one end of a link 195, the other end of which is pivoted to an arm 196 at 197. The lower end of the arm 196 is pivoted upon the axis of the trunnion 165. The arm 196 is provided with a circular slot 198 concentric with the trunnion axis and through which a locking screw 199 extends. Screw 199 has threaded connection with an extension 200 of one of the ears 170 projecting from the plate 169. Movement of the arm 196 is thus transmitted to the block, through the extension 200 of the ear 170, which in turn, is connected to the block. Motion of the arm is derived from the cam 182 through the system of connecting links and levers above described. The links 189 and 195 are provided with means for adjusting their length. In setting up and adjusting the machine to process a given heel, the required angular position of the block is obtained by properly adjusting the length of the links 189 and 195 and also by utilizing the adjustment provided by the locking screw 199, which when loosened permits the block to be manually swung in any desired position, after which the screw is tightened to lock the adjustment.

Spring means are provided for maintaining contact of the cam 182 against the follower 183. Any suitable means will serve this purpose. As shown herein, the upper portion of the arm 196 has connected thereto a tension spring 201. The other end of the spring is anchored to the end of an adjusting rod 202. The rod 202 has threaded engagement with a stud 203 projecting from the fulcrum 192 of the lever 191. The spring 201 is connected to a block 204 which has a swivel connection with the rod 202. To adjust the spring tension, the rod is rotated by means of a wing nut 205. As the adjustment is made, the rod turns in the block 204 without tending to twist the end of the spring. By pulling upon the arm 196, the spring 201 sets up a resilient pressure between the cam 182 and the follower 183, which maintains them in contact as the follower moves along the cam.

After the necessary adjustments have been completed and a correctly shaped cam secured in position at each of the processing stations, the machine is ready for operation. To perfect the character of the smoothing operation to its highest degree, it may be found desirable to adjust the tension of the spring members 46 by turning the hand wheel 61, thereby to adapt the operation of the machine to heel material of varying degree of hardness or to material having special characteristics requiring special conditions of operation. Further variations in the processing procedure may be introduced by the use of smoothing tools having various degrees of coarseness to suit them to a given condition.

The shape of the cam 182 is determined by the contour of the heel. A suitable procedure for constructing the cam curve and adjusting the elements of the machine to produce a predetermined desired result can readily be worked out by a skilled operator after which the machine may be attended by an unskilled operator, since its operation is completely automatic. An effective method of deriving a cam curve is as follows. A cam pattern blank is temporarily fastened in the inner end of the cam holding plate 184. The heel to be treated is then placed in a heel jack at one of the processing stations with its axis of symmetry upon the axis of the turret 65. The turret is then turned until the back line of the heel is facing the smoothing belt 110. The various adjustments of the block, above described, are then manipulated to bring the correct portion of the form block profile into register with the heel profile. Since, as hereinbefore stated, the active face of the block 149 is generated by straight line movement of the master curve of the heel profile, the position of the block must, therefore, be carefully adjusted, to insure that the direction of the line along which the block face is generated lies parallel to the plane in which the heel travels.

With the adjustments all carefully checked, the carrier is moved by hand through a series of small increments of its travel along the smoothing belt. At each position, the block is tilted about its trunnion support by hand to match the contour of the heel to that of the block. This movement of the block through the inter-connecting elements, moves the cam pattern. A mark is made on the cam pattern at the position which the cam follower assumes for the particular test position. A series of marks are thus made on the pattern representing each test position throughout the complete travel of the heel across the smoothing belt. From this series of marks, a smooth cam curve is constructed and the working cam face shaped accordingly.

In Figs. 14 and 15, a mechanism of modified construction for automatically matching the heel contour to the block contour is shown. In this construction, the contour block is first adjusted to its correct position to match the heel with its back line extending radially outward from the carrier axis. The block is then locked against further movement and the cam 182 is removed. In this form of the invention, means are provided for raising and lowering the heel itself vertically with respect to the form block. To accomplish this, the heads 40 are lifted bodily to thereby lift the heel. The construction of the head, therefore, differs to some extent from that hereinbefore described. This construction differs only in respect to the manner of supporting the head on the pivot shaft. The head is pivoted upon a shaft 206, the upper end of which projects into a bracket 207 secured to the upper face of the top plate 60. The shaft 206 is supported in its vertical position by the bracket 41 of the same construction as that used in connection with the previously described form of heads 40. The shaft 206 is freely movable axially in the bracket, but is held against rotation, by means of a spline 208.

The bottom of the shaft 206 is provided with a roll 209 which engages a cam 210 and is held thereagainst by a spring 211 surrounding the shaft and bearing at one end against a shoulder on the bracket 207 and at its other end against the top pivot bearing 213, of the shaft 206. The shaft 206 also passes through a bottom pivot bearing 214. The two bearings 213 and 214 act to maintain the head in fixed relative alignment with the shaft 206. The cam 210 is so positioned within the machine base that it will be traversed by the follower roll 209 during the passage of the heel across the smoothing belt 110.

The shape of the cam 210 is determined to cause the heel to rise and fall in the required degree to match the form block contour to the heel contour at all relative positions of the heel and block. The lifting of the cam and roll is transmitted to the head through the shoulder 215 formed upon the enlarged bottom of the shaft 206 and upwards through a shoulder 216 upon the upper face of the control element 72 to the housing 217 of the head. The gear 71, the element 72 and the gear 70 are rigidly secured to a sleeve 218, which rotates freely upon the shaft 206, thereby driving the turret 65 and jack 66. As the head moves upward under the influence of the cam 210, the shaft 206, the head and all connecting parts, move upward, which movement compresses the spring 211, while the upper end of the shaft moves upward into the elongated upper end of an aperture 219 formed in the bracket 207.

The vertical position of the cam 210 is adjustable by means of the mechanism shown in Fig. 18. The cam is secured in a vertically movable carriage member 219, with its upper portion projecting through a slot in the bottom wall of the housing 39. The member 219 has formed thereon the female member of a dovetail slide 220, which is received in the male member of the slide formed upon a bracket 221 securely screwed to the bottom face of the housing 39. Adjustment of the cam is provided by a screw 222, rotatably mounted in and held against axial movement with respect to the carriage 219 and having threaded engagement with the bracket 221. Adjustment of the cam is thereby facilitated by rotation of a hand wheel 223 secured to the bottom end of the screw 222.

Fig. 16 illustrates diagrammatically a suitable arrangement for operation of a machine by the use of smoothing belts driven horizontally instead of vertically. The construction and function of the machine is the same as in the preferred embodiment, first above described, with the exception of the means for supporting and driving the smoothing belts.

One processing station or a plurality may be employed as illustrated in Fig. 16. The smoothing belts 224 travel over pairs of pulleys 225 and 226 mounted respectively upon vertical shafts 227 and 228 journaled in a supporting frame 229. The pulley 225 is driven by a motor 230 directly connected to the shaft 227. The belt is firmly stretched over the face of the form block 149 by a suitable tightening means, not shown. In this form of the machine the travel of the belt is substantially at right angles to the vertical heel axis.

While the operation of each portion of the apparatus has been covered in the general description, it may assist in and clarify the understanding of the general operation of the machine, to briefly review its operation in correct functional sequence.

The untreated heel is received by the operator with its back and side areas shaped to its final contour upon a heel turning or shaping machine. Other heel shaping operations, such as concaving the seat and grading the toplift end of the heel may be performed before or after they are received by the operator of the smoothing machine. The operator inserts heels in the jacks, as they are presented to him. The heel is carefully placed in position in the jack with its breast corners properly engaging the fingers 112. The operator follows along with the continuously moving carrier, holding the heel in position until the clamp 89 descends. The heel then starts to rotate as it approaches station A. At the correctly timed instant, the follower 107 rides outward along the cam 109, moving the side face of the heel into engagement with the belt 110, at its breast corner. The heel continues to rotate, presenting every portion of its side and back areas to the belt, after which it is retracted by the cam 109A. During its traverse across the belt, the contour of the heel and form block are maintained in accurate match by means of the cam 182 and its inter-connecting elements. The heel then proceeds to the other stations, where it is further processed and then arrives at the unload or ejecting station, where rotation of the jack is stopped and the clamp 89 is raised to permit the heel to fall or be ejected from the machine.

With respect to the form of the machine wherein the travel of the smoothing belts is described as vertical, it should be noted that the important structural feature involved is that the belts travel substantially parallel to the vertical axis or axis of symmetry of the heels and that it is immaterial what position the assembled parts assume with respect to the plane of the support upon which the machine base rests.

A valuable characteristic of the preferred construction is that the smoothing belts continue to function efficiently over a relatively long period of usefulness. This results from the fact that the smoothing action takes place while the heel is traversing the full width of the belt thus utilizing its whole area. Furthermore the abrasive material on the belts does not tend to wear down rapidly or become filled with chips excessively, because random portions of the belts are contacted by successive heels thereby utilizing every portion of the belts to best advantage. The many important advantages of this apparatus will be apparent to those skilled in the art pertaining to heel manufacture. Some of the most important of these advantages are the high speed of production which is obtained by continuous operations and the availability of a relatively large number of heel holding jacks. Furthermore, it is possible to execute a plurality of operations upon the heel with no decrease in production speed, but with a tremendously great increase in the quality of work obtained.

Among other outstanding advantages of the machine are its high economy of operation, its durability and its ability to maintain precision of operation over a long period of usefulness. Due to the precise manner of its operation, the heels produced are held within extremely close limits to their intended dimensions and contour.

I claim:

1. In a machine for smoothing the side and back areas of shoe heels, a base, a circular carrier rotatably mounted upon said base, a ring gear fixed upon said base concentric with the axis of said carrier, a plurality of heel feeding heads, pivotally mounted at one of their ends upon and arranged substantially tangential to the periphery of said carrier and having their free outer ends movable substantially along a radius from the axis of the carrier, a pinion gear for each head rotatably mounted upon the pivotal axis thereof and meshing with and driven by said ring gear, a revolving turret in the outer end of said head, having a heel holding jack thereon, a gear train in said head in which said pinion gears are the drivers, said trains of gears acting to rotate said turret in predetermined timed relation to the rotation of said carriage, a driven smoothing tool presenting a face shaped to conform to the heel contour and means for causing engagement and disengagement of heels in said jacks, thereby to execute the smoothing operation.

2. In a machine for smoothing the side and back areas of shoe heels, a base, a circular carrier rotatably mounted upon said base, a ring gear fixed upon said base concentric with the axis of said carrier, a plurality of heel feeding heads pivotally mounted at one of their ends upon and arranged substantially tangential to the periphery of said carrier and having their outer free ends movable substantially along a radius from the axis of the carrier, a pinion gear for each head, rotatably mounted upon the pivotal axis thereof and meshing with and driven by said ring gear, revolving turrets in the outer free ends of said heads, having heel holding jacks thereon, a gear train in each head, in which said pinion gears are the driving members, said trains of gears acting to rotate said turrets in predetermined timed relation to the rotation of said carriage, a driven smoothing tool in the form of a flexible belt, a form block presenting a working face having a contour complementary to the master curve of the heel profile and over which said smoothing tool passes and is held in close contact and automatic cam pattern means for shifting said block in timed relation to the rotation of the heels in the jack, whereby the contour of the heel at all portions of its side and back areas is matched by the contour of the block throughout the smoothing operation.

3. In a machine for smoothing the back and side areas of shoe heels, a base, a circular carrier rotatably mounted on said base, a plurality of heel feeding heads, pivotally mounted at one of their ends upon and arranged substantially tangential along the periphery of said carrier having their outer free ends movable substantially along a radius from the carrier axis, driven smoothing tool situated adjacent the periphery of said carrier, resilient members engaging and urging the free ends of said heads outward, heel jacks upon the outer ends of said heads, means for rotating the jacks in timed relation to the movement of said carrier, means acting to retain said heads from outward movement for a portion of their travel, a cam acting to permit said heads to swing outward under the influence of said resilient members at a predetermined position in their travel to cause engagement of the heels in the jacks with said smoothing tool, thereby to execute the smoothing operation and means for simultaneously adjusting the degree of resiliency of all of said resilient members.

4. A machine for smoothing the side and back areas of shoe heels comprising a base, a circular carrier rotatably mounted on said base, means for continuously rotating said carrier, a plurality of heel feeding heads pivoted upon and swingable outward away from said carrier, a plurality of heel holding jacks mounted on said heads, clamping means on said jacks for clamping the heels with their vertical axis substantially perpendicular to the plane of travel of said carrier, means for rotating said jacks with respect to the carrier, including a driving member fixed on said base and a driven member on each jack coacting with said driving member, a form block situated adjacent the carrier on said base, presenting a working face having a profile contour matching the master curve of the heel profile, a smoothing tool in the form of a flexible belt having means for driving it across in close contact with the working face of said form block and in a direction parallel to the plane of travel of said carriage and means for moving said heads with respect to the carrier to present heels clamped in the jacks to said smoothing tool, thereby to execute the smoothing operation.

5. In a machine for smoothing the back and side faces of shoe heels having the elements defined in claim 4, together with a plurality of heel treating mechanisms of the same construction as that defined therein.

6. A machine for smoothing the back and side faces of shoe heels comprising a base, a carrier driven upon said base and having a plurality of heel feeding heads thereon, each of said heads having a heel jack rotatably mounted thereon, a form block situated on said base adjacent said carrier, presenting a working face having a contour matching the master profile curve of heels being treated, a smoothing tool in the form of a flexible belt driven across and held in close contact with the working face of said form block, means for rotating the jacks including a driving member on said base and a driven member on each jack coacting with said driving member, means for successively moving said heads with respect to the smoothing tool to cause the heels therein to engage the tool and thereby execute the smoothing operation and cam pattern means to move said head bodily perpendicularly to the plane of movement of said carrier during the smoothing operation, thereby to shift the heels with respect to said form block to match the contour of the heel to the block.

7. A machine for smoothing the previously shaped side and back areas of a shoe heel comprising a frame, a driven smoothing tool, a continuously driven carrier on said frame acting to move the heel into operative position adjacent said tool, heel manipulating means upon said carrier acting to move the heel bodily away from said carrier into engagement with said tool, a heel holding jack on said heel manipulating means, a clamp on said jack, a heel positioning stop coacting with said clamp to grip the heel in said jack in a predetermined position with respect to its breast face, means for rotating said jacks in timed relation to the position of the heel therein and to the travel of said carrier said rotating means having a driving member on said frame and a driven member on said jacks a second timing means coacting in positive timed relation to said first timing means to cause said heel manipulating means to move the heel into engagement with said tool at a predetermined position upon the heel and to withdraw the heel from the tool at the end of the smoothing operation at a second predetermined position upon the heel.

8. A machine for smoothing the previously shaped side and back areas of a shoe heel comprising a frame, a driven smoothing tool, a continuously moving carrier on said frame acting to move the heel into position adjacent said tool, heel manipulating means on said carrier acting to move the heel laterally outward from said carrier to engage said tool, a heel jack on said heel manipulating means acting to hold and to rotate the heel upon a unidirectional heightwise axis, means for positioning the heel in a predetermined radial position with respect to said axis, a positively acting mechanical interconnecting means for coordinating the radial position of the heel with the motion of said carriage and said heel manipulating means to cause an accurately predetermined portion of the heel area to be processed to first engage the tool and to retract the heel from the tool after the smoothing operation is completed.

9. A machine for smoothing the previously shaped side and back areas of a wooden shoe heel comprising a frame, a driven smoothing tool, a carrier for feeding the heels into smoothing position adjacent said tool, a plurality of heel manipulating heads on said carrier operable to move said heels laterally outward from the carrier to engage said tool, heel jacks on said heads, means for rotating said jacks thereby to rotate the heels upon a heightwise axis said rotating means including a driving member on said carrier and a driven member on each of said jacks, a stop gauge on each jack to position said heels within the jacks in a predetermined position, gear-like mechanical means acting positively to maintain a fixed timed relation between the radial position of the heel and jack and the position of the carrier, a second timing means whose action is coordinated with the timed movement of said heel and jack acting, through said heel maniplating heads, to cause the heels successively to engage the tool with one side face thereof tangent thereto at its breast corner and means for separating the heel and tool after the heel has rotated to present its side and back areas and has arrived at a position with its other breast corner tangent to the face of said tool.

10. A machine for smoothing the previously shaped side and back areas of a shoe heel comprising a base, a circular carrier member rotatably mounted on said base, a driven smoothing tool situated adjacent the periphery of said carrier, a plurality of heel holding jacks rotatably mounted on said carrier adjacent its periphery, means for holding the heels in said jacks with their heightwise axis substantially parallel to the axis of rotation of the jacks and in a predetermined radial position with respect to the said axis, positive driving means acting to rotate said jacks in fixed timed relation to the travel of said carrier and to the radial position of the heel, said driving means having a driving member fixed to said base and a driven member on each jack, means acting in timed relation to the radial position of the heel in the jack to move the heel and jack bodily with respect to the carrier into operating relation with said tool and to control the period of engagement of the heel therewith to cause the tool to act once over the heel surfaces and to start and stop the smoothing action precisely at the breast corners of the heel.

11. A machine for smoothing the sides and back areas of a shoe heel comprising a frame, a driven smoothing tool at least as wide as the height of the heel and having the form of a flexible belt, a carrier on said frame for feeding the heels to be treated along the surface of said tool at uniform speed, a plurality of heel manipulating heads movably mounted on said carrier, a heel holding jack for each head rotatably mounted thereon, said head being operable to move the heels in said jacks relatively to the carrier and into engagement with said tool, means to rotate the jacks having a driving member on said frame and a driven member on each jack whereby the heels are rotated as they are moved along the surface of said tool thereby to present the entire area of the treated surfaces of the heel to the tool and a rigid form block over which said smoothing tool is driven and held in close contact at the heel treating position, said form block having its active face presenting the contours generated by movement in a straight line of the profile curve complementary to the master profile of the heel contour.

12. A machine for smoothing the previously shaped sides and back areas of a shoe heel comprising a frame, a carrier, means for moving said carrier at uniform speed upon said frame, a plurality of heel manipulating heads connected to said carrier and movable outward substantially laterally from the path of travel of said conveyor, a heel holding jack rotatably mounted on each head, gauging means on the jacks for accurately positioning the heels therein with their axes of symmetry in line with the axis of rotation of the jacks and with the heels in a predetermined radial position with respect to the jack, means to rotate the jacks including a driving member on said frame and a driven member on each jack, a smoothing tool having the form of a relatively wide flexible belt, a rigid form block fixed adjacent said carrier and presenting an active face having a profile contour complementary to that of the heel sides, means acting in timed relation to the rotation of said jacks and to the travel of said carrier to move said heads to cause engagement of the heels with said tool and retract them therefrom in such manner that the smoothing operation will be initiated at one breast corner, proceed successively around the adjacent sides, the back and opposite side faces of the heel and end at the other breast corner.

13. A machine for smoothing the previously shaped side and back areas of shoe heels comprising a frame, a carrier movable upon the frame, means to drive the carrier at uniform speed, a plurality of heel manipulating heads on said carrier so connected thereto that they are movable laterally away from the path of travel thereof, a heel holding jack rotatably mounted on each of said heads having means for clamping heels therein with their heightwise axis substantially in line with the axis of rotation of the jack, means for rotating the jacks, a smoothing tool having the form of a flexible belt of substantial width situated adjacent said carrier, means to drive said tool in a direction substantially parallel to the axes of the heels and automatic means acting in timed relation with the movement of said carrier to move said heads to cause the heels therein first to engage said tool near one of its edges thereby to initiate the smoothing operation and to retract the heels from the tool after said carrier has moved the heels laterally across the tool and substantially to its other edge.

14. A machine for smoothing previously shaped back and side areas of shoe heels comprising a frame, a carrier on said frame, means to move said carrier with uniform speed upon said carrier, a plurality of heel manipulating heads on said carrier so connected thereto that they are movable laterally away from the path of travel thereof, a heel holding jack rotatably mounted on each of said heads having means for clamping heels therein with their heightwise axes substantially in line with the axis of rotation of the jacks, means for rotating the jacks, a smoothing tool having the form of a flexible belt of substantial width situated adjacent the periphery of said carrier, means to drive the tool in a direction substantially parallel to the axis of the heels, a rigid form block over which said smoothing tool is driven and held in close contact at the heel treating position, the active face of said block presenting the form generated by movement in a straight line of the profile curve complementary to the master profile of the heel and automatic means acting in timed relation to the movement of said carrier to move said head to cause the heels therein first to engage said tool near one of its edges thereby to initiate the smoothing operation and to retract the heels from the tool after the carrier has moved the heels laterally across the tool and substantially to its other edge.

15. In a machine for smoothing the previously shaped side and back areas of shoe heels, comprising the elements defined in claim 14 together with automatic means acting in timed relation to the travel and rotation of the heels to match the heel contour with that of the block during the smoothing operation and including pivots upon which said form block may rock, a mechanically driven block rocking mechanism, having an element movable upon the frame and a rigid mechanical connection between said movable member and said form block.

16. A machine for smoothing the side and back areas of shoe heels comprising a frame, a carrier on said frame having a plurality of heel holding jacks rotatably mounted thereon, means for driving said carrier, means for rotating said jacks in timed relation to the movement of said carrier, a form block presenting a working face having a contour shaped to match the profile curve of said heel sides, a driven smoothing tool having the form of a flexible belt, passing over and held in close contact with the working face of said form block, means for moving the jacks with respect to the carrier to present heels held therein to said tool, pivoting means to permit angular shifting of the position of said block, a mechanism on said frame having an element movable according to a predetermined pattern and deriving its motion from the movement of said carrier, rigid mechanical inter-connecting members between said movable member and said block acting to shift the block position with respect to the heels in predetermined timed relation to their rotation while engaging said tool thereby to match the contour of the block to the heel sides during the smoothing operation.

17. A machine for smoothing the side and back areas of shoe heels comprising a frame, a carrier, means for continuously moving said carrier upon said frame, said carrier having a plurality of heel holding jacks thereon, means for rotating said jacks in timed relation to the travel of said carrier, a form block presenting a working face shaped to match the profile contour of the heel sides, pivoting means for permitting angular shifting of the position of said block, a driven smoothing tool having the form of a flexible belt passing over and held in close contact with the working face of said form block, means for moving said jacks with respect to the carrier to present the heels held therein to said tools, a form block shifting mechanism having a cam and a coacting follower one of these elements being mounted on said carrier and the other upon said frame, a movable member on said frame receiving motion from said cam and follower, positively acting mechanical means connecting said movable member with said form block to move the block in predetermined timed relation with respect to the rotation of the heel as it traverses said block thereby to match the contours of the heel and block during the smoothing operation.

18. A machine for smothing the side and back areas of shoe heels comprising a frame, a carrier, means for continuously moving said carrier upon said frame, a plurality of heel holding jacks rotatably mounted on said carrier, means for rotating said heel jacks in timed relation to the travel of said carrier, a form block presenting a working face shaped to match the profile curve of the heel sides, a driven smoothing tool having the form of a flexible belt passing over and held in close contact with the said working face of the form block, means for moving said jacks with respect to the carrier to present the heels held therein to said tool, pivoting means for permitting angular movement of said block, the axis of which lies adjacent to and extends in substantially the same direction as that in which the heel travels, form block shifting mechanism having a cam and a coacting follower one of these elements being mounted upon said carrier and the other upon said frame, a movable member on said frame receiving motion from said cam and follower, positively acting mechanical means connecting said movable member and said block to rock the block about its axis in predetermined timed relation to the rotation of the heels, whereby the heel contour and the block contour are matched continuously during the smoothing operation.

19. A machine for smoothing the side and back areas of shoe heels comprising a frame, a carrier, means for continuously driving said carrier upon said frame, a plurality of heel holding jacks on said carrier, means for rotating said jacks about an axis substantially perpendicular to the plane of movement of said carrier, said jacks having means thereon for supporting a heel with its heightwise axis substantially coinciding with the axis of rotation of the jacks, a form block presenting a working face shaped to match the profile contour of the heel sides, a smoothing tool having the form of a flexible belt driven across the working face of said form block in a direction substantially parallel to the axis of rotation of said jack, means for moving said jacks with respect to the carrier to present the heels therein to said tool, form block shifting mechanism having a cam and a coacting follower one of these elements being mounted upon the carrier and the other upon said frame, a movable member on said frame receiving motion from said cam and follower, and positively acting mechanical means connecting said movable member and said block to shift the angular position of the block in predetermined timed relation to the rotation of the heels as they traverse the said block thereby to match the contours of the heel and block continuously throughout the smoothing operation.

20. A machine for smoothing the back and side areas of shoe heels having a base, a circular carrier rotatably mounted on the base, means to rotate said carrier, a plurality of heel jacks rotatably mounted upon the periphery of said carrier, a ring gear fixed upon said base, concentric with the axis of said carrier and extending for a portion only of its complete circumference, a gear on each jack driven from said ring gear thereby rotating said jack in timed relation to the rotation of said carrier, a jack controlling segment occupying the remaining portion of the circumference of said ring gear and having a smooth concentric portion throughout substantially its full length, a stop element upon each jack which coacts with said control segment to stop rotation of the jack and lock it against rotation while engaging said segment, a clamp jaw on each jack for holding the heels in the jack, means to raise said jaw to release a finished heel while the jack is held against rotation, toothed means at the trailing edge of said control segment coacting with said stop element to initiate rotation of said jack at the end of its travel along said segment and cause said jack driving gear again to be driven by said ring gear and a driven smoothing tool adjacent the path of said heels and means to cause engagement of the heels and the tool to execute the smoothing operation.

21. A machine for smoothing the back and side areas of shoe heels comprising a base, a continuously driven carrier, a plurality of heel holding jacks rotatably mounted on said carrier, a driven smoothing tool in the form of a flexible belt situated adjacent the path of said jacks, means for rotating said jacks including an interrupted toothed gear fixed upon said base and a gear on each of said jacks meshing with said fixed gear acting upon movement of said carrier to cause interrupted rotation of said jacks throughout the machine cycle thereby to provide opportunity, when the jacks are stopped, to remove a treated heel and replace an untreated one therein, means acting when the jacks are rotating to present all portions of the side and back areas of the heel to said tool, a form block on said base adjacent the carrier having a working face presenting a contour complementary to the master heel profile and over which said smoothing tool passes and is held in close contact, a form block shifting mechanism having a cam and a coacting follower one of these elements being mounted on the carrier and the other on said base, a movable member on the said base receiving motion from said cam and follower, rigid mechanical inter-connecting means between said movable member and said form block acting to shift said block angularly in timed relation to the rotation of the heel upon the tool thereby to match the heel and form block contours during the smoothing operation.

22. A machine for smoothing the side and back areas of shoe heels comprising a base, a circular carrier rotatably mounted on said base, means for driving said carrier continuously at uniform speed, a plurality of heel holding jacks rotatably mounted on said carrier, a ring gear fixed on said base concentric with the carrier axis and having a portion of its periphery interrupted, a gear on each of said jacks having driving connection with said ring gear whereby the jacks are rotated during a portion of the machine cycle, coacting elements on the ring gear and jacks acting to stop rotation of the jacks and lock them against rotation in a predetermined radial position, throughout the remaining portion of the machine cycle, a clamping jaw for holding the heels in the jacks, means for releasing said jaw while rotation of the jacks has been stopped to permit a treated heel to be removed and an untreated one inserted in the jacks, a pair of gauging fingers on said carrier adjacent each jack, means for moving the fingers into gauging position with respect to the jacks during the time when untreated heels are inserted therein and to retract said fingers from their gauging position after insertion of the heel, a driven smoothing tool adjacent said carrier, a supporting head for each jack within which they are rotatably received, means on said carrier for permitting substantially radial movement of the heads with respect to said carrier and means for moving said heads outward to cause engagement of the heels with said tool during that portion of the machine cycle when the heels are rotated.

23. A machine for smoothing the side and back areas of shoe heels comprising a frame, a carrier member mounted on said frame, means for moving the carrier upon the frame, a plurality of heel holding jacks rotatably mounted on said carrier, means for rotating said jacks including a driving member fixed to said frame and a driven member connected to each jack, said driving and driven members having means thereon for rotating the jacks during the smoothing operation and stopping their rotation at a predetermined point in the machine cycle at which time a treated heel is removed from the jack and an untreated heel is placed therein, a pair of gauging fingers on said carrier for each jack having gauging notches at their outer ends, means acting at the time an untreated heel is placed in the jack to position said fingers with respect to the jacks to permit the operator to place the heels accurately in predetermined position by placing the heel breast corners within the notches on said fingers, a driven smoothing tool on said frame adjacent said carrier, a supporting member for each jack within which it is rotatably received having means for permitting movement of the jacks with respect to the carrier and means acting through said jack supporting members to cause the heels within the jacks to engage said smoothing tool thereby to execute the smoothing operation.

24. A machine for smoothing the side and back areas of a shoe heel comprising a frame, a carrier member mounted on the frame, means for moving the carrier upon the frame, a plurality of heel holding jacks rotatably mounted on said carrier, means for rotating said jacks including a driving member fixed to said frame and a driven member connected to each jack said driving and driven members having means thereon for rotating the jacks during the smoothing operation and stopping their rotation at a predetermined point in the machine cycle to permit removal of a treated heel and insertion of an untreated heel in the jack, a pair of heel positioning fingers on said carrier adjacent each jack having gauging surfaces thereon, cam means for moving said fingers into and out of gauging position with respect to the jacks when the jacks are in position to receive an untreated heel whereby the operator by placing the breast corners of the heel in contact with said gauging surfaces may accurately locate the heel in predetermined position in the jack and means for simultaneously and uniformly adjusting the separation of said fingers for all the jacks, thereby to facilitate accurately gauging the position of heels of various sizes, a driven smoothing tool adjacent said carrier and means for interengaging said tool and heels to execute the smoothing operation.

25. A machine for smoothing the back and side faces of shoe heels comprising a base, a circular carrier mounted on said base, means for rotating said carrier at constant uniform speed, a plurality of heel manipulating heads mounted on the periphery of said carrier, each head having a heel holding jack rotatably mounted therein, means for permitting said heads to move with respect to said carrier in a manner to effect substantially radial outward movement of the jacks, a heel clamp on each jack for gripping the heel therein, means for rotating the jacks including a driving element fixed to said base and a driven element connected to each jack, means on the driving and driven members coacting to rotate the jacks during the smoothing operation and to stop their rotation during the period when a treated heel is removed from the jacks and an untreated heel inserted therein, a cam on said frame acting automatically to engage and release said clamping means while the jacks are stopped from rotating, a driven smoothing tool adjacent the periphery of said carrier and means for moving said heel manipulating heads to present the heels in the jacks to said tool while they are rotated thereby to execute the smoothing operation.

GEORGE CLAUSING.

CERTIFICATE OF CORRECTION.

Patent No. 2,352,690.

July 4, 1944.

GEORGE CLAUSING.

It is hereby certified that error appears in the printed specification of the above numbered patent requiring correction as follows: Page 4, first column, line 4, strike out "a ring gear 73 fixed upon the superstructure 28"; page 6, first column, line 47, for "positioning" read --position--; page 8, first column, line 18, for the words "swing in" read --swing it--; and that the said Letters Patent should be read with this correction therein that the same may conform to the record of the case in the Patent Office.

Signed and sealed this 29th day of August, A. D. 1944.

(Seal)

Leslie Frazer
Acting Commissioner of Patents.